No. 730,385. Patented June 9, 1903.

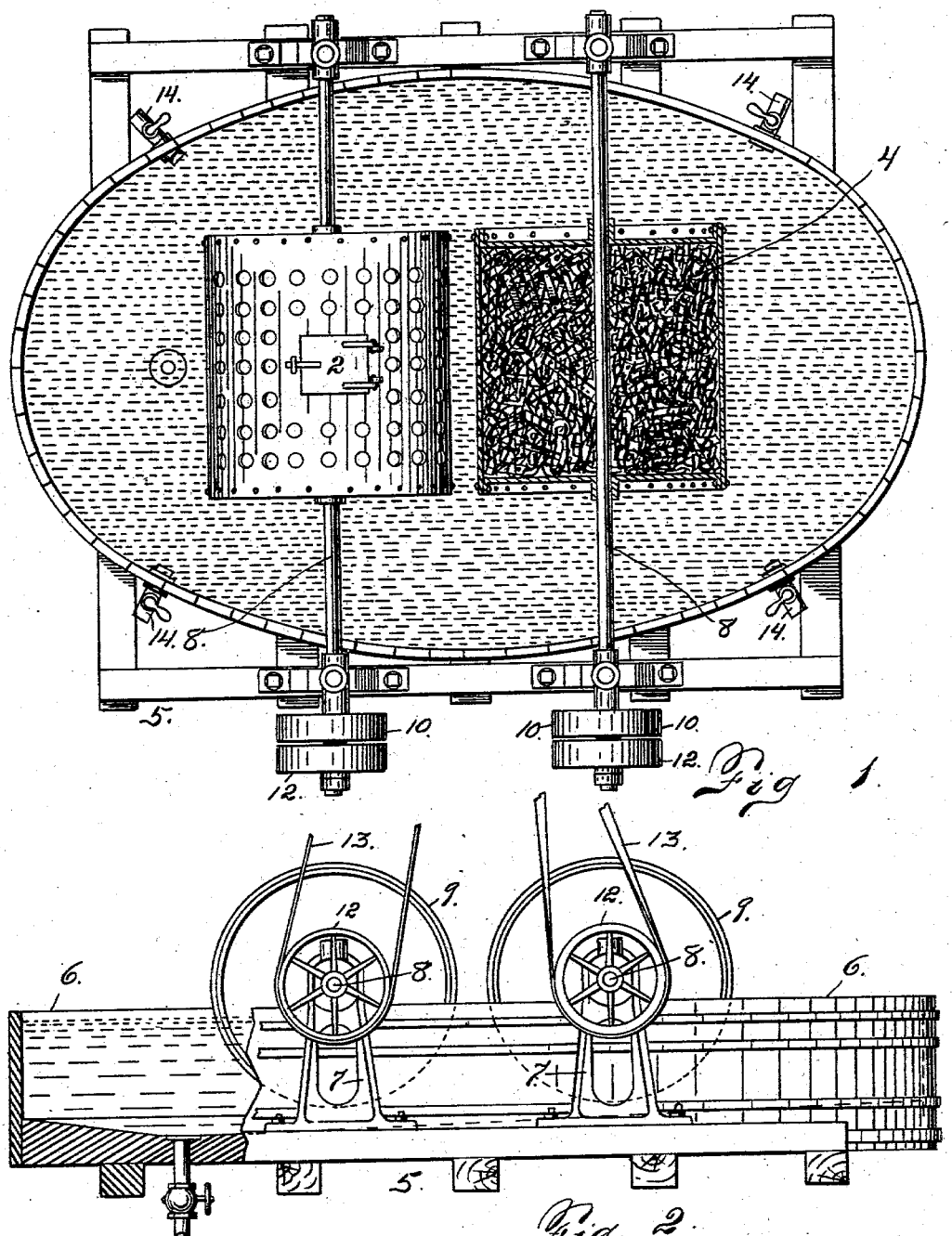

UNITED STATES PATENT OFFICE.

PETER W. McCAFFREY, OF DENVER, COLORADO, ASSIGNOR TO THE UNION ORE EXTRACTION AND REDUCTION COMPANY, OF DENVER, COLORADO.

APPARATUS FOR THE PRECIPITATION OF METALS FROM SOLUTIONS.

SPECIFICATION forming part of Letters Patent No. 730,385, dated June 9, 1903.

Application filed September 2, 1902. Serial No. 121,916. (No model.)

*To all whom it may concern:*

Be it known that I, PETER W. MCCAFFREY, a citizen of the United States of America, residing at Denver, in the county of Arapahoe and State of Colorado, have invented certain new and useful Improvements in Apparatus for the Precipitation of Dissolved Metallic Values; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in apparatus for the precipitation of dissolved metallic values, being more especially intended for the precipitation of copper.

Briefly stated, the invention consists of a tank or receptacle adapted to hold the solution containing the dissolved values and one or more perforated cylinders filled with scrap metal and arranged to revolve in said solution, whereby the latter is made to circulate or pass through the scrap metal in the cylinder or cylinders. The iron takes the place of the copper in the solution, and the latter is precipitated, falling to the bottom of the tank.

Having briefly outlined my improvement, I will proceed to describe the same in detail, reference being made to the accompanying drawings, in which is illustrated an embodiment thereof.

In the drawings, Figure 1 is a top or plan view of my improved apparatus, one of the cylinders being shown in section to disclose the scrap-iron within. Fig. 2 is a side elevation of the same, the solution-containing tank being shown partly in section.

The same reference characters indicate the same parts in both views.

Let the numeral 5 designate a suitable rectangular frame, upon which is mounted a tank 6, which, as shown in the drawings, is elliptical in plan view. It must be understood, however, that the invention is not limited to any particular shape of tank. Mounted on each side of the frame, adjacent the tank, are two standards 7. In the upper extremities of these standards are journaled two shafts 8, which are located above and extend across the top of the tank. Upon these shafts are mounted and made fast two perforated copper cylinders filled with scrap-iron 4. On one extremity of each shaft are mounted fast and loose pulleys, (designated 10 and 12, respectively.) The cylinders are rotated by connecting belts 3 with the fast pulleys of the shafts, the said belts being connected with a line-shaft (not shown) or any suitable motor or source of power. When the apparatus is in operation, the solution containing the dissolved copper to be precipitated is placed in the tank 6, the latter being preferably filled within a few inches of the top. The cylinders 9, containing the scrap-iron, being partially immersed in the solution are then rotated, whereby the solution is caused to circulate through the scrap-iron, which being acted on by the solution results in a chemical reaction forming ferrous sulfate, ($FeSO_4$.) The iron takes the place of the copper in the solution, the copper being precipitated and settling to the bottom of the tank. After the operation has been continued a sufficient period to precipitate practically all the copper in the solution, the latter, having been transformed by the chemical reaction into ferrous sulfate of iron, is decanted off and the copper precipitated, removed through a suitable outlet in the bottom of the tank, the said bottom being hopper-shaped for the purpose set forth. (See Fig. 2.)

The tank 6 is provided with valve-controlled inlets 14 to permit the introduction of live steam, which facilitates the chemical action and accelerates the process of precipitation.

Each cylinder should be provided with a door 2, adapted to be opened for the purpose of inserting and removing the scrap-iron.

The foregoing detail description has special reference to the precipitation of copper, in which the cylinders are filled with scrap-iron. In the precipitation of other values other scrap metal may be required. Hence the invention is not limited to cylinders containing scrap-iron. The term "scrap metal" as used in this specification is intended to cover metal which is sufficiently finely divided to expose to the action of the liquid a considerable area of surface and which at the same time will be sufficiently loose in the cylinders to permit the liquid to circulate freely therethrough.

Having thus described my invention, what I claim is—

1. In apparatus for the precipitation of dissolved metallic values, the combination of a tank adapted to hold the solution to be treated, and a perforated receptacle containing scrap metal, the perforated walls of the said receptacle being composed entirely of the same material, said receptacle being partially immersed in said solution and mounted to rotate therein, whereby the solution is made to circulate through the scrap metal for the purpose set forth.

2. In precipitation apparatus, the combination of a tank adapted to hold the solution, and a perforated cylinder containing scrap-iron, the curved wall of said cylinder being constructed entirely of homogeneous material, said cylinder being mounted to rotate in the tank whereby it is partially immersed in the solution which is caused to circulate through the scrap-iron by the rotary action.

3. In precipitation apparatus, the combination of a tank adapted to hold the solution from which the precipitate is to be obtained, and a number of perforated cylinders mounted to rotate in said tank, said cylinders being filled with scrap-iron and partially immersed in the solution whereby the latter is caused to circulate through the scrap-iron as the cylinders are rotated, the tank being provided with a hopper-shaped bottom and an outlet for drawing off the precipitate, and having valve-controlled inlets for the injection of live steam to the solution, substantially as described.

4. In precipitation apparatus, the combination of a tank to hold the solution, and a perforated cylinder containing scrap-iron, the curved walls of said cylinder being composed entirely of sheet metal, said cylinder being mounted to rotate in the tank whereby it is partially immersed in the solution which is caused to circulate through the scrap-iron by the rotary action.

5. In precipitation apparatus, the combination of a tank adapted to hold the solution, and a perforated cylinder containing scrap-iron, the curved wall of the cylinder being composed entirely of sheet-copper, said cylinder being mounted to rotate in the tank whereby it is partially immersed in the solution which is caused to circulate through the scrap-iron by the rotary action.

In testimony whereof I affix my signature in presence of two witnesses.

PETER W. McCAFFREY.

Witnesses:
DENA NELSON,
A. J. O'BRIEN.